(12) United States Patent
Imaeda et al.

(10) Patent No.: US 11,899,030 B2
(45) Date of Patent: Feb. 13, 2024

(54) PLATE CHANGER AND CHROMATOGRAPH INCLUDING THE PLATE CHANGER

(71) Applicant: SHIMADZU CORPORATION, Kyoto (JP)

(72) Inventors: Kodai Imaeda, Kyoto (JP); Takuya Sawada, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 393 days.

(21) Appl. No.: 17/287,329

(22) PCT Filed: Nov. 2, 2018

(86) PCT No.: PCT/JP2018/040905
§ 371 (c)(1),
(2) Date: Apr. 21, 2021

(87) PCT Pub. No.: WO2020/090121
PCT Pub. Date: May 7, 2020

(65) Prior Publication Data
US 2021/0356486 A1 Nov. 18, 2021

(51) Int. Cl.
*G01N 35/04* (2006.01)
*G01N 30/24* (2006.01)

(52) U.S. Cl.
CPC ............. *G01N 35/04* (2013.01); *G01N 30/24* (2013.01); *G01N 2035/0425* (2013.01)

(58) Field of Classification Search
USPC ...................................................... 73/61.55
See application file for complete search history.

(56) References Cited

U.S. PATENT DOCUMENTS

| | | | | |
|---|---|---|---|---|
| 5,125,748 A | * | 6/1992 | Bjornson | G01N 21/253 |
| | | | | 356/414 |
| 5,441,645 A | * | 8/1995 | Sanford | G01N 30/32 |
| | | | | 210/198.2 |
| 8,894,929 B2 | * | 11/2014 | Itoh | G01N 35/04 |
| | | | | 422/65 |

(Continued)

FOREIGN PATENT DOCUMENTS

| | | | | |
|---|---|---|---|---|
| CN | 105987973 B | | 9/2018 | |
| EP | 2664925 A1 | * | 11/2013 | ............. B65G 1/026 |

(Continued)

OTHER PUBLICATIONS

International Search Report for corresponding Application No. PCT/JP2018/040905, dated Jan. 15, 2019.

(Continued)

*Primary Examiner* — Jacques M Saint Surin
(74) *Attorney, Agent, or Firm* — Renner, Otto, Boisselle & Sklar, LLP

(57) ABSTRACT

A plate changer includes a casing that stores a sample plate and one or a plurality of first rack plates that each support the sample plate. One or a plurality of plate supporters that respectively support the one or plurality of first rack plates at different heights are provided in the casing. Each first rack plate is configured to be supportable on and removable from any of the one or plurality of plate supporters. The plate changer further includes a detector that detects whether the first rack plate is supported on each plate supporter.

14 Claims, 10 Drawing Sheets

(56) References Cited

U.S. PATENT DOCUMENTS

| | | | |
|---|---|---|---|
| 9,606,033 B2 | 3/2017 | Maeda | |
| 2020/0041531 A1 | 2/2020 | Sawada | |

FOREIGN PATENT DOCUMENTS

| | | | | |
|---|---|---|---|---|
| JP | 2016-070695 A | 5/2016 | | |
| WO | 2018/168076 A1 | 9/2018 | | |
| WO | 2020/039558 A1 | 2/2020 | | |
| WO | 2020/054033 A1 | 3/2020 | | |
| WO | WO-2020090121 A1 * | 5/2020 | ................ | B01L 3/50 |

OTHER PUBLICATIONS

Written Opinion for corresponding Application No. PCT/JP2018/040905, dated Jan. 15, 2019 (partial English translation).
Decision of Refusal in corresponding CN Application No. 201880098800.8 dated Nov. 24, 2024, with English machine translation.

* cited by examiner

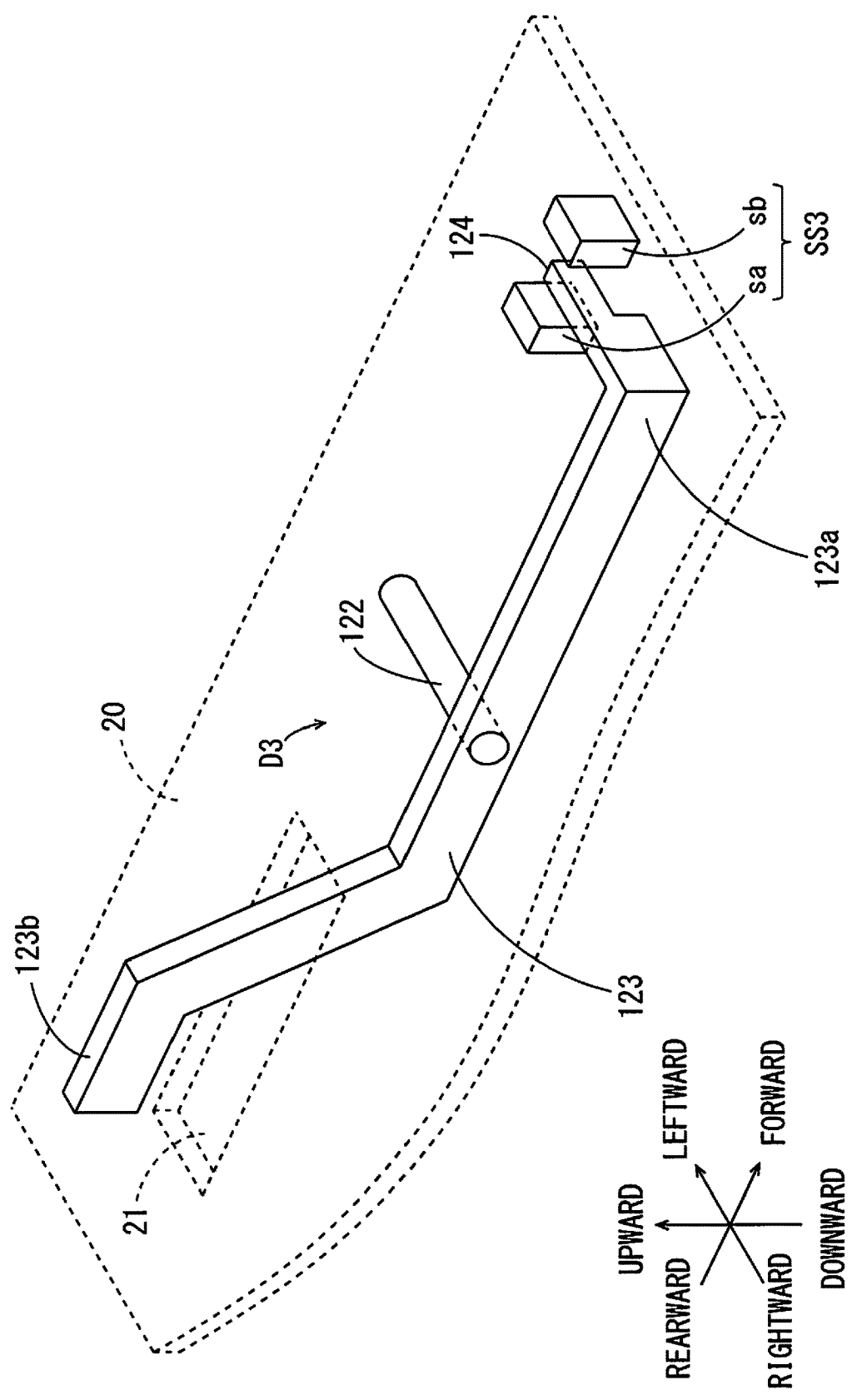
F I G. 4

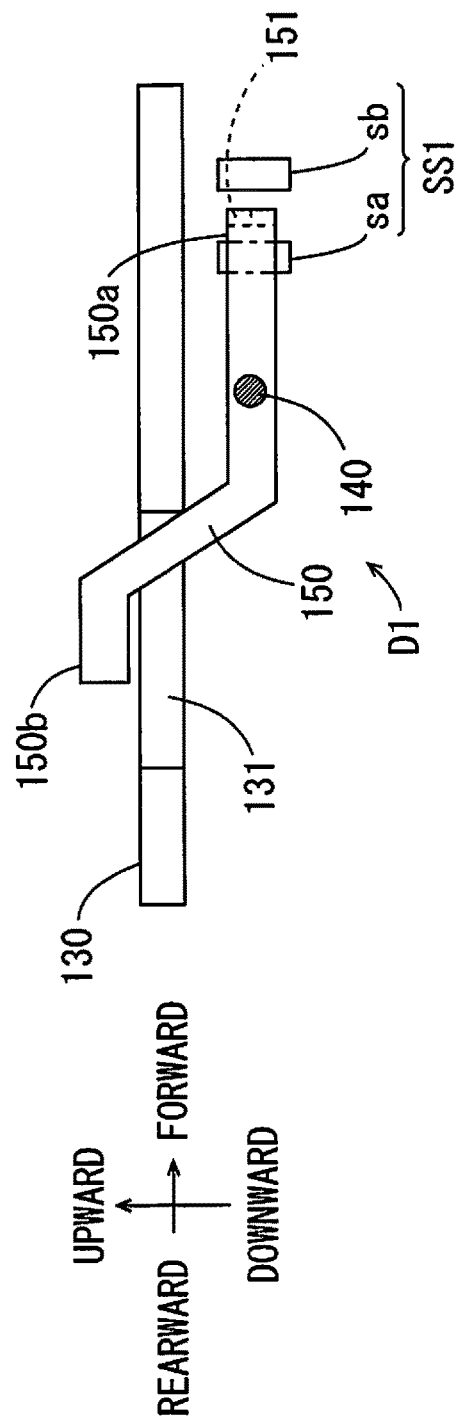

PLATE CHANGER AND CHROMATOGRAPH INCLUDING THE PLATE CHANGER

TECHNICAL FIELD

The present invention relates to a plate changer that carries out supply and collection of a sample plate to an autosampler, and a chromatograph including the plate changer.

BACKGROUND ART

In an autosampler used in an analysis device such as a liquid chromatograph, a sample plate is positioned at a predetermined position, for example. The sample plate is a plate that holds a plurality of sample vials or a plurality of samples themselves. In this state, the samples held in the sample plate are injected into an analysis flow path of the analysis device (see Patent Document 1, for example).

As a device attached to the autosampler, a plate changer for automatically supplying the sample plate to the autosampler is present. The plate changer includes a plate storage and a plate transporter. The plate storage stores a plurality of sample plates. The plate transporter transports the sample plates between the plate storage and the autosampler.
[Patent Document 1] JP 2016-70695 A

SUMMARY OF INVENTION

Technical Problem

In the plate storage, a plurality of rack plates on which a plurality of sample plates are respectively placed are provided to line up with a certain spacing from each other in a top-and-bottom direction, for example. However, the plurality of sample plates stored in the plate storage do not necessarily have a same height (a size in the top-and-bottom direction). As such, the spacing between the plurality of rack plates is set such that a sample plate with a maximum height can be placed. Thus, the number of sample plates storable in the plate storage is limited by a dimension of the plate storage in the top-and-bottom direction and a dimension of the sample plate with a maximum height.

Meanwhile, in the plate storage, efficiency of an analysis operation is improved if a larger number of sample plates are stored. As such, in a case where the plurality of sample plates to be used have small heights, a new rack plate is added so that a larger number of sample plates can be stored. In this case, accurate transportation of the sample plates cannot be performed unless a position of each rack plate in the plate storage is accurately identified.

An object of the present invention is to provide a plate changer in which the number of rack plates is changeable and the position of each rack plate can be easily identified, and a chromatograph including the plate changer.

Solution to Problem (1) A plate changer according to one aspect of the present invention carries out supply and collection of a sample plate to an autosampler, and includes a casing that stores a sample plate, one or a plurality of first rack plates that each support the sample plate, one or a plurality of plate supporters that respectively support the one or plurality of first rack plates at different heights in the casing, and a first detector that detects whether the first rack plate is supported on each plate supporter, wherein each first rack plate is configured to be supportable on and removable from the one or plurality of plate supporters.

In the plate changer, a user can make the first rack plate supported on any of the one or plurality of plate supporters in the casing. Also, the user can remove the first rack plate supported on any of the one or plurality of plate supporters in the casing. In this way, since the number of the first rack plates in the casing is changeable, the user can effectively utilize an internal space of the casing depending on a dimension of the sample plate to be used in a top-and-bottom direction and a dimension of the casing in the top-and-bottom direction.

It is detected whether the first rack plate is supported on each plate supporter. This makes it possible to accurately identify a position of the first rack plate in the casing. Thus, reliability of transportation of the sample plate in the plate changer is improved.

(2) The first detector may include one or a plurality of rack plate detectors that are respectively provided corresponding to the one or plurality of plate supporters, each rack plate detector may include a first movable member configured to be changeable between a first state and a second state, and a first sensor that detects which one of the first state and the second state the first movable member is in, and the first movable member may be provided to be brought into the first state when the first rack plate is not supported on the corresponding plate supporter and brought into the second state when the first rack plate is supported on the corresponding plate supporter.

In this case, it can be detected whether the first rack plate is supported on each plate supporter with a simple configuration.

(3) The first sensor may be an optical sensor that emits light to a predetermined first detection region and also receives light from the first detection region to output a signal corresponding to an amount of the received light, and the first movable member may have a first light shield capable of shielding the light emitted from the first sensor, and may be provided such that the first light shield is positioned in the first detection region when the first movable member is in one of the first state and the second state and such that the first light shield is positioned outside of the first detection region when the first movable member is in the other of the first state and the second state.

In this case, it can be easily and accurately detected which one of the first state and the second state the first movable member is in, based on the signal output from the first sensor.

(4) The first movable member may be changeable to the first state and the second state by being rotated around a predetermined first rotation shaft, the first movable member may be held in the first state by not abutting against the first rack plate when the first rack plate is not supported on the corresponding plate supporter, and the first movable member may be held in the second state by abutting against the first rack plate when the first rack plate is supported on the corresponding plate supporter.

In this case, the first movable member is changed between the first state and the second state in conjunction with placement of the first rack plate on the corresponding plate supporter and removal of the first rack plate from the corresponding plate supporter. Thus, reliability of detection as to whether the first rack plate is supported on each plate supporter is improved.

(5) The plate changer may further include a second detector that detects whether the sample plate is placed on each of the one or plurality of first rack plates supported on the one or plurality of plate supporters.

In this case, it is detected whether the sample plate is placed on each first rack plate. This makes it possible to accurately identify a storage state of the one or plurality of sample plates in the casing.

(6) The second detector may include one or a plurality of first plate detectors respectively provided corresponding to the one or plurality of plate supporters, each first plate detector may include a second movable member configured to be changeable between a third state and a fourth state, and a second sensor that detects which one of the third state and the fourth state the second movable member is in, wherein the second movable member may be provided to be brought into the third state when the first rack plate is not supported on the corresponding plate supporter and when the first rack plate is supported on the corresponding plate supporter and the sample plate is not supported on the first rack plate, and brought into the fourth state when the first rack plate is supported on the corresponding plate supporter and the sample plate is supported on the first rack plate.

In this case, it can be detected whether the sample plate is supported on each first rack plate with a simple configuration.

(7) The second sensor may be an optical sensor that emits light to a predetermined second detection region and also receives light from the second detection region to output a signal corresponding to an amount of the received light, and the second movable member may have a second light shield capable of shielding the light emitted from the second sensor, and may be provided such that the second light shield is positioned in the second detection region when the second movable member is in one of the third state and the fourth state and such that the second light shield is positioned outside of the second detection region when the second movable member is in the other of the third state and the fourth state.

In this case, it can be easily and accurately detected which one of the third state and the fourth state the second movable member is in, based on the signal output from the second sensor.

(8) Each first rack plate may be provided with an elastic member that is deformed by the sample plate supported on the first rack plate, and the second movable member may be changeable to the third state and the fourth state by being rotated around a predetermined second rotation shaft, the second movable member may be held in the third state by not abutting against the elastic member when the first rack plate is not supported on the corresponding plate supporter and when the first rack plate is supported on the corresponding plate supporter and the sample plate is not supported on the first rack plate, and the second movable member may be held in the fourth state by abutting against the deformed elastic member provided on the first rack plate when the first rack plate is supported on the corresponding plate supporter and the sample plate is supported on the first rack plate.

In this case, the second removable member is changed between the third state and the fourth state in conjunction with placement of the sample plate on the first rack plate on the corresponding plate supporter and removal of the sample plate from the first rack plate on the corresponding plate supporter. Thus, reliability of detection as to whether the sample plate is supported on each first rack plate is improved.

(9) The plate changer may further include one or a plurality of second rack plates that are fixed at heights different from the heights of the one or plurality of plate supporters in the casing and each support the sample plate.

In this case, the user can place the sample plate on the one or plurality of second rack plates without supporting the first rack plate on the one or plurality of plate supporters in the casing. Also, the one or plurality of second rack plates are fixed in the casing. This makes it possible to accurately identify the position of the one or plurality of second rack plates in the casing.

(10) The plate changer may further include a third detector that detects whether the sample plate is placed on each of the one or plurality of second rack plates.

In this case, it is detected whether the sample plate is placed on each second rack plate. This makes it possible to accurately identify the storage state of the one or plurality of sample plates in the casing.

(11) The third detector may include one or a plurality of second plate detectors that are respectively provided corresponding to the one or plurality of second rack plates, each second plate detector may include a third movable member configured to be changeable between a fifth state and a sixth state, and a third sensor that detects which one of the fifth state and the sixth state the third movable member is in, and the third movable member may be provided to be brought into the fifth state when the sample plate is not supported on the corresponding second rack plate and brought into the sixth state when the sample plate is supported on the corresponding second rack plate.

In this case, it can be detected whether the sample plate is supported on each second rack plate with a simple configuration.

(12) The third sensor may be an optical sensor that emits light to a predetermined third detection region and also receives light from the third detection region to output a signal corresponding to an amount of the received light, and the third movable member may have a third light shield capable of shielding the light emitted from the third sensor, and may be provided such that the third light shield is positioned in the third detection region when the third movable member is in one of the fifth state and the sixth state and such that the third light shield is positioned outside of the third detection region when the third movable member is in the other of the fifth state and the sixth state.

In this case, it can be easily and accurately detected which one of the fifth state and the sixth state the third movable member is in, based on the signal output from third sensor.

(13) The third movable member may be changeable to the fifth state and the sixth state by being rotated around a predetermined third rotation shaft, the third movable member may be held in the fifth state by not abutting against the sample plate when the sample plate is not supported on the corresponding second rack plate, and the third movable member may be held in the sixth state by abutting against the sample plate when the sample plate is supported on the corresponding second rack plate.

In this case, the second movable member is changed between the fifth state and the sixth state in conjunction with placement of the sample plate on the corresponding second rack plate and removal of the sample plate from the corresponding second rack plate. Thus, reliability of detection as to whether the sample plate is supported on each second rack plate is improved.

(14) The plate changer may further include a presenter that presents a detection result by the first detector.

In this case, the user can easily and accurately identify a position of the first rack plate in the casing based on the presented detection result.

(15) A chromatograph according to another aspect of the present invention includes an autosampler and the aforementioned plate changer.

The chromatograph includes the aforementioned plate changer. In the aforementioned plate changer, an internal space of the casing is effectively utilized, so that a larger number of sample plates are stored in the casing. Thus, efficiency of an analysis operation is improved. Also, in the aforementioned plate changer, since the position of the first rack plate is accurately identified, reliability of the supply and collection of the sample plate to the autosampler is improved.

Advantageous Effects of Invention

According to the present invention, a plate changer in which the number of rack plates is changeable and the position of each rack plate can be easily identified, and a chromatograph including the plate changer are implemented.

BRIEF DESCRIPTION OF THE DRAWINGS

FIG. 4 is a schematic perspective view of a plate detector of FIG. 3.

FIGS. 9A and 9B are schematic side views for explaining a function of the rack plate detector.

DESCRIPTION OF EMBODIMENTS

Figure 1:
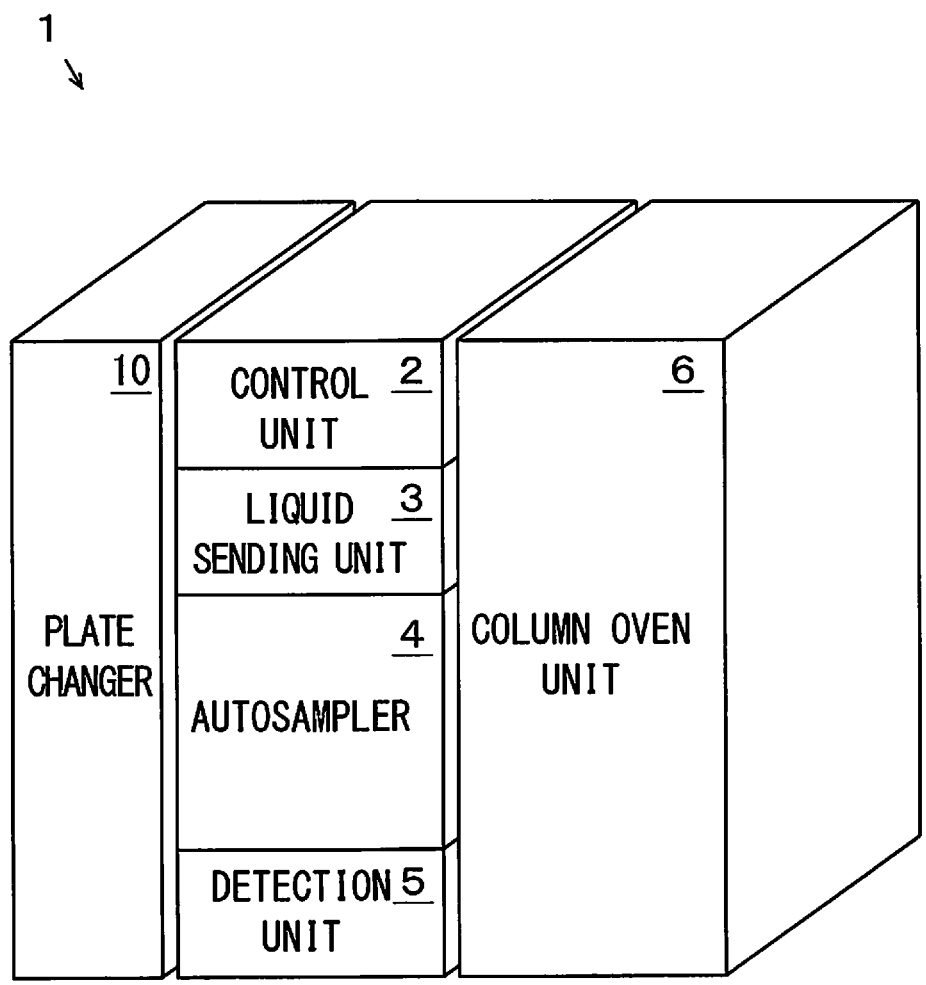
FIG. 1 is a schematic view showing the appearance of one example of a liquid chromatograph according to one embodiment of the present invention.

A plate changer according to one embodiment of the present invention and a chromatograph including the plate changer will be described below with reference to the drawing. A liquid chromatograph will be explained below as an example of the chromatograph.

[1] Schematic Configuration of Liquid Chromatograph

FIG. 1 is a schematic view showing the appearance of one example of the liquid chromatograph according to the one embodiment of the present invention. As shown in FIG. 1, the liquid chromatograph 1 includes a control unit 2, a liquid sending unit 3, an autosampler 4, a detection unit 5, a column oven unit 6, and a plate changer 10.

The plate changer 10 carries out supply and collection of sample plates to the autosampler 4. Details of the plate changer 10 will be described later. The liquid sending unit 3 supplies a mobile phase stored in a mobile phase container not shown to a column provided in the column oven unit 6. The autosampler 4 receives a sample plate in which a plurality of samples to be analyzed are held from the plate changer 10. Also, the autosampler 4 injects the samples held in the sample plate into the mobile phase supplied to the column from the liquid sending unit 3. Further, the autosampler 4 transfers a used sample plate to the plate changer 10.

The column oven unit 6 includes the column and keeps a temperature of the column and a temperature of a space around the column at a substantially constant temperature. The detection unit 5 detects each component of samples separated by the column. The mobile phase that has passed through the detection unit 5 is sent to a waste liquid container not shown. The control unit 2 includes, for example, a CPU (central processing unit) and a memory and controls an operation of each of portions constituting the liquid chromatograph 1.

In the example of FIG. 1, the detection unit 5, the autosampler 4, the liquid sending unit 3, and the control unit 2 are arranged in a stacked manner in this order from bottom to top. The plate changer 10 and the column oven unit 6 are arranged in one direction with the stacked detection unit 5, autosampler unit 4, liquid sending unit 3, and control unit 2 interposed therebetween.

[2] Plate Changer 10

Figure 2:
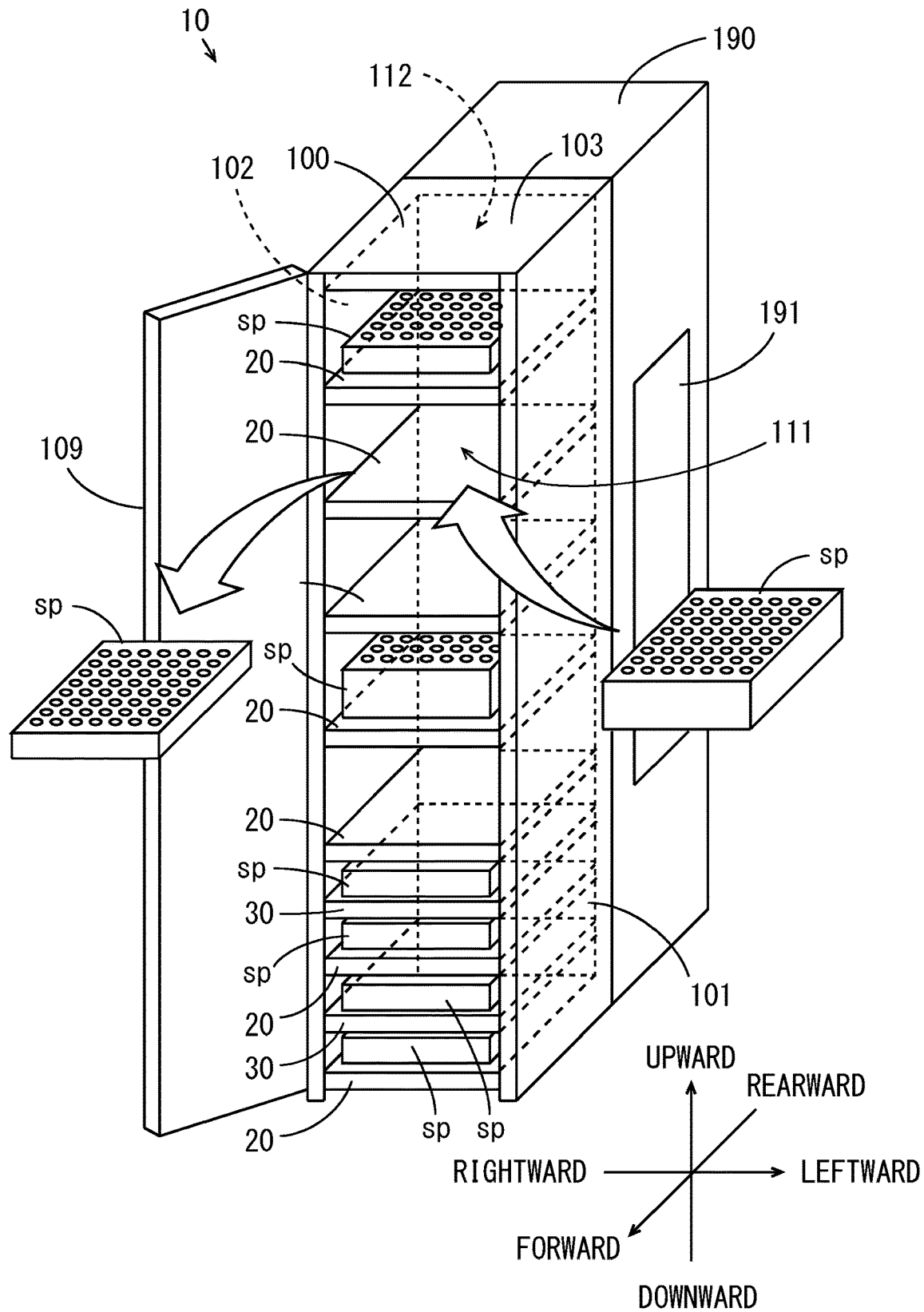
FIG. 2 is a perspective view showing the appearance of a plate changer of FIG. 1.

FIG. 2 is a perspective view showing the appearance of the plate changer 10 of FIG. 1. As shown in FIG. 2, the plate changer 10 mainly includes a plate storage 100 and a plate transporter 190. The plate storage 100 and the plate transporter 190 each have a substantially cuboid shape, and are formed to extend in a top-and-bottom direction and adjacently connected to each other.

As for the plate changer 10 according to this embodiment, a direction directed to the plate storage 100 from the plate transporter 190 in a horizontal plane is referred to as frontward of the plate changer 10, and a direction opposite to this direction is referred to as rearward of the plate changer 10. A direction directed to a left from a center of the plate changer 10 when the front of the plate changer 10 is viewed from the center of the plate changer 10 is referred to as leftward of the plate changer 10, and a direction opposite to this direction is referred to as rightward of the plate changer 10.

The plate storage 100 has a left sidewall 101, a right sidewall 102, a ceiling 103, and a plurality of (seven in this example) fixed rack plates 20. The left sidewall 101 and the right sidewall 102 are rectangular plate members extending in the top-and-bottom direction and are provided in parallel to face each other in a left-and-right direction. In the following explanation, a surface of the left sidewall 101 and a surface of the right sidewall 102 that face each other are referred to as an inner surface of the left sidewall 101 and an inner surface of the right sidewall 102, respectively. The ceiling 103 couples an upper end of the left sidewall 101 and an upper end of the right sidewall 102.

The plurality of fixed rack plates 20 are each formed of a rectangular plate member and are provided between the left sidewall 101 and the right sidewall 102 so as to line up with a predetermined spacing from each other in the top-and-bottom direction. Each fixed rack plate 20 couples the left sidewall 101 and the right sidewall 102 and is also fixed.

Also, the fixed rack plate 20 is configured to be capable of supporting a sample plate sp to be used in the autosampler 4 of FIG. 1. The fixed rack plate 20 provided at a lowermost end doubles as a floor of the plate storage 100. It is noted that a floor may be provided separately from the fixed rack plate 20 at the lowermost end.

The plate storage 100 has a front opening 111 at a front end thereof and has a door 109 that opens or closes the front opening 111. The door 109 is attached to the right sidewall 102 so as to be rotatable around a rotation shaft extending in the top-and-bottom direction. Moreover, the plate storage 100 has a rear opening 112 at a rear end thereof.

A user can place sample plates sp on the plurality of fixed rack plates 20 through the front opening 111 as denoted by a hollow arrow of FIG. 2 with the door 109 opened. Also, the user can take out a sample plate sp placed on any of the plurality of fixed rack plates 20 through the front opening 111.

Figure 11:
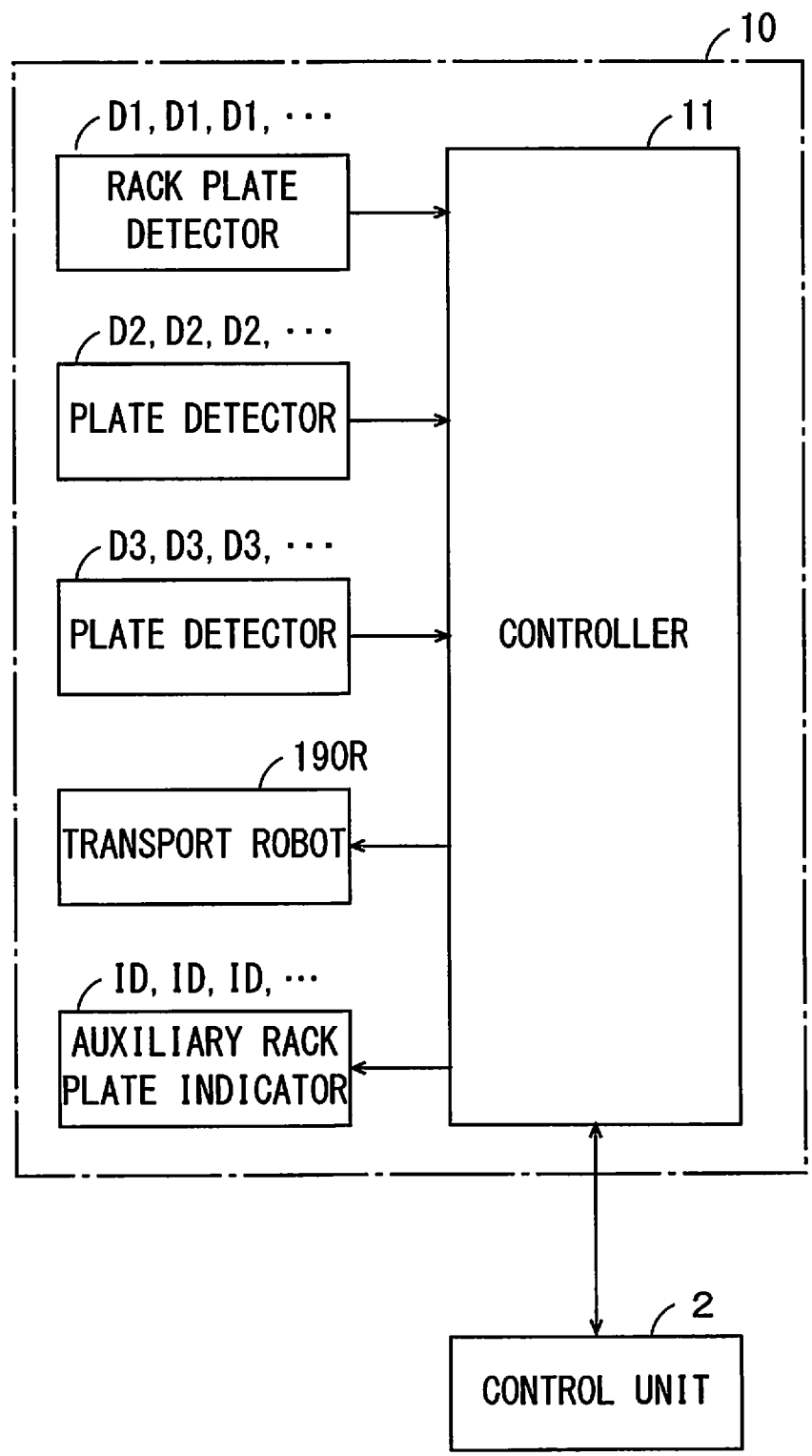
FIG. 11 is a block diagram for explaining a control system of the plate changer.

The plate transporter 190 includes a transport robot 190R (FIG. 11). The transport robot 190R takes out a sample plate sp in the plate storage 100 through the rear opening 112 and transports the sample plate sp to the autosampler 4 of FIG. 1. Thus, the sample plate sp is supplied to the autosampler 4.

Also, the transport robot 190R takes out the sample plate sp in the autosampler 4 and transports the sample plate sp into the plate storage 100 through the rear opening 112. Thus, the sample plate sp is collected into the plate changer 10. An opening 191 for carrying out supply and collection of the sample plate sp to the autosampler 4 is formed on a left side portion of the plate transporter 190.

The sample plates sp used in the autosampler 4 of FIG. 1 are plates that each hold a plurality of sample vials or a plurality of samples themselves, and a plurality of types of the sample plates sp are present. These plurality of types of sample plates sp each have a unique height (a size in the top-and-bottom direction). For example, the sample plate sp that holds sample vials has a comparatively large height (a size in the top-and-bottom direction). On the other hand, the sample plate sp that holds samples themselves has a comparatively small height (a size in the top-and-bottom direction).

As such, a spacing between the plurality of fixed rack plates 20 is set to be larger than the height of the sample plate sp with a maximum height. In this case, when a sample plate sp with a comparatively small height is placed on the fixed rack plate 20, a surplus space is formed between the sample plate sp and the fixed rack plate 20 above the sample plate sp.

As such, the plate changer 10 according to this embodiment is configured such that a new rack plate that supports a sample plate sp can be added as an auxiliary rack plate 30 between the plurality of fixed rack plates 20. In the example of FIG. 2, one auxiliary rack plate 30 is attached between a fixed rack plate 20 of a first shelf and a fixed rack plate 20 of a second shelf, and another auxiliary rack plate 30 is attached between the fixed rack plate 20 of the second shelf and a fixed rack plate 20 of a third shelf. Thus, two sample plates sp are stored between the fixed rack plate 20 of the first shelf and the fixed rack plate 20 of the second shelf, and another two sample plates sp are stored between the fixed rack plate 20 of the second shelf and the fixed rack plate 20 of the third shelf.

Figure 3:
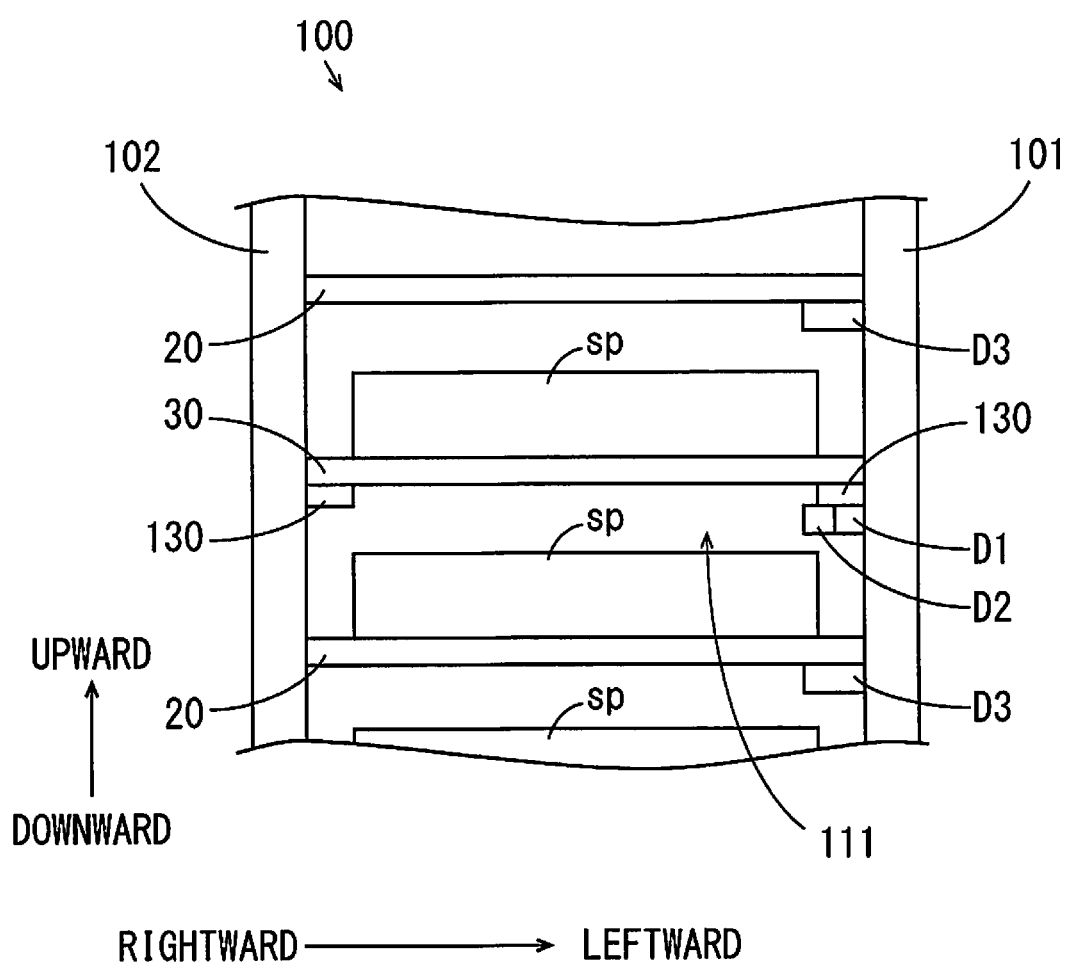
FIG. 3 is a partially enlarged front view of a plate storage showing a fixed rack plate of a second shelf and a fixed rack plate of a third shelf and a vicinity portion of these rack plates.

FIG. 3 is a partially enlarged front view of the plate storage 100 showing the fixed rack plate 20 of the second shelf and the fixed rack plate 20 of the third shelf of FIG. 2 and a vicinity portion of these fixed rack plates. In FIG. 3, an illustration of the door 109 is not shown. As shown in FIG. 3, a pair of left and right plate supporters 130 that supports the auxiliary rack plate 30 in an intermediate position between the two fixed rack plates 20 facing each other in the top-and-bottom direction is provided between the two fixed rack plates 20.

The left plate supporter 130 is provided to project rightward by a certain distance from the inner surface of the left sidewall 101 and to extend rearward from the front end of the plate storage 100. The right plate supporter 130 is provided to project leftward by a certain distance from the inner surface of the right sidewall 102 and to extend rearward from the front end of the plate storage 100. The left and right plate supporters 130 are opposed to each other.

The auxiliary rack plate 30 is formed of a substantially rectangular plate member and configured to be supportable on and removable from the pair of plate supporters 130. The user inserts the auxiliary rack plate 30 in a horizontal attitude into a space between the pair of left and right plate supporters 130 and the fixed rack plate 20 upward of this pair of left and right plate supporters 130 from the front opening 111, so that the user can easily place both side portions of the auxiliary rack plate 30 (a pair of supported portions 32 of FIG. 6 described below) on the pair of plate supporters 130. Also, the user can easily take out the auxiliary rack plate 30 supported on the pair of plate supporters 130 from the front opening 111.

In the plate storage 100 of FIG. 2, seven auxiliary rack plates 30 are supportable and removable at positions upward of seven fixed rack plates 20, respectively. As such, the plate storage 100 can store a maximum of 14 sample plates sp.

As shown in FIG. 3, a plurality of rack plate detectors D1 for detecting whether the auxiliary rack plates 30 are supported on a plurality of pairs of plate supporters 130 are provided in the plate storage 100. Also, a plurality of plate detectors D2 for detecting whether the sample plates sp are placed on the auxiliary rack plates 30 supported on the plurality of pairs of plate supporters 130 are provided. Furthermore, a plurality of plate detectors D3 for detecting whether the sample plates sp are placed on the plurality of fixed rack plates 20 are provided.

The plurality of rack plate detectors D1 respectively correspond to the plurality of plate supporters 130 provided on the left sidewall 101. The plurality of plate detectors D2 respectively correspond to the plurality of plate supporters 130 provided on the left sidewall 101. Furthermore, the plurality of plate detectors D3 respectively correspond to the plurality of fixed rack plates 20. The rack plate detectors D1, the plate detectors D2, D3, and the auxiliary rack plates 30 will be described in detail below.

[3] Details of Plate Detectors D3

Figure 5A:
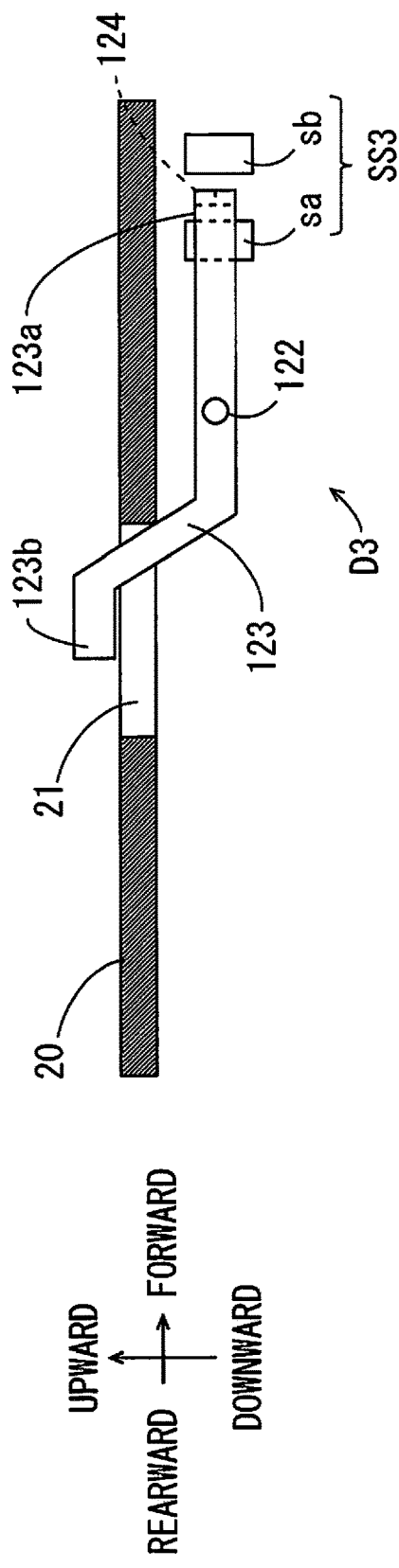
FIGS. 5A and 5B are schematic side views for explaining a function of the plate detector.
Figure 5B:
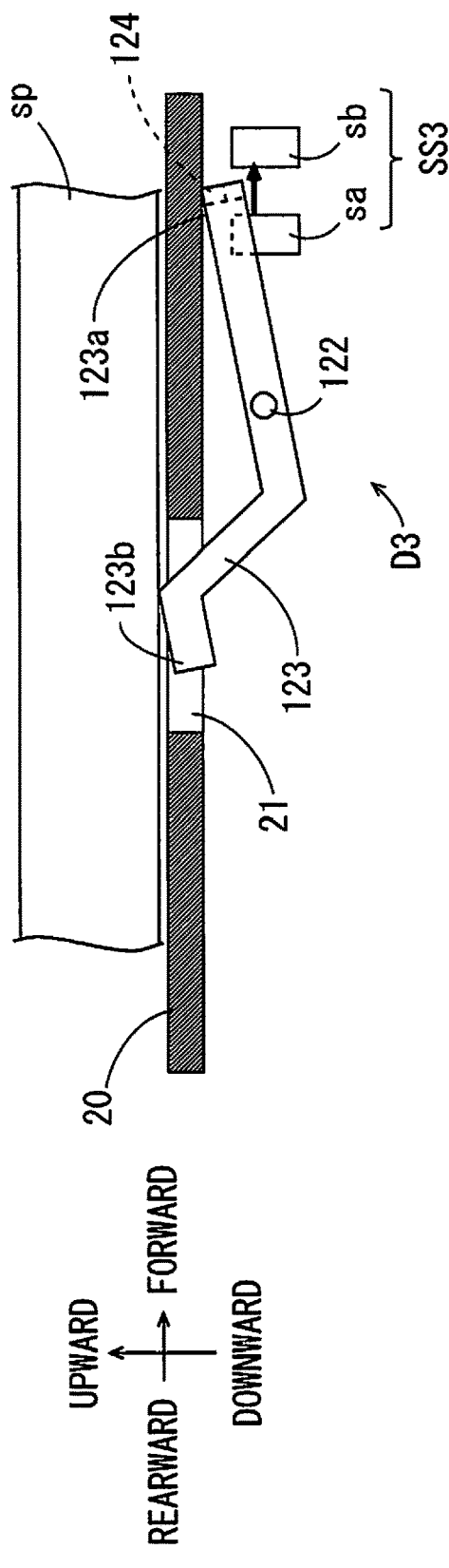

Each plate detector D3 is attached to the inner surface of the left sidewall 101 so as to be positioned downward of the corresponding fixed rack plate 20. FIG. 4 is a schematic perspective view of the plate detector D3 of FIG. 3, and FIGS. 5A and 5B are schematic side views for explaining a function of the plate detector D3.

As shown in FIG. 4, the plate detector D3 includes a support shaft 122, a rotation member 123, and an optical sensor SS3. The support shaft 122 extends rightward by a certain distance from the inner surface of the left sidewall 101 at a position downward of the corresponding fixed rack plate 20. The rotation member 123 is an elongated plate member having one end 123a and another end 123b. A center of the rotation member 123 is attached to the support shaft 122 such that the rotation member 123 extends basically in a front-and-rear direction and is rotatable around the support shaft 122. In this state, the one end 123a is positioned forward of the other end 123b.

A front half of the rotation member 123 from the center to the one end 123a thereof extends linearly. The one end 123a of the rotation member 123 is bent leftward toward the inner surface of the left sidewall 101. A tip of the one end 123a is provided with a light shield 124. A rear half of the rotation member 123 from the center to the other end 123b thereof is bent obliquely upward with the rotation member 123 attached to the support shaft 122.

Also, the rotation member 123 is formed such that a weight of the front half is larger than that of the rear half. As such, a torque directed in one direction is generated in the rotation member 123 such that the front half is lowered and the rear half is raised without a load applied to the rotation member 123.

An opening 21 is formed in the fixed rack plate 20. With the front half of the rotation member 123 of the corresponding plate detector D3 being held horizontally, the opening 21 guides the other end 123b of the rotation member 123 from a space downward of the fixed rack plate 20 to a space upward of the fixed rack plate 20.

The optical sensor SS3 is a transmissive photointerrupter having a light emitter sa and a light receiver sb, and is attached to the inner surface of the left sidewall 101 at a position downward of the corresponding fixed rack plate 20 and forward of the support shaft 122. The light receiver sb of the optical sensor SS3 is configured to be capable of receiving light emitted from the light emitter sa and is also configured to output a signal corresponding to an amount of the received light. The light emitter sa and the light receiver sb of the optical sensor SS3 are arranged in the front-and-rear direction with a spacing therebetween so as to interpose a moving path of the light shield 124 therebetween when the rotation member 123 rotates about the support shaft 122. As the optical sensor SS3, a reflective photointerrupter may be used.

In the aforementioned plate detector D3, with a sample plate sp not placed on the fixed rack plate 20, the light shield 124 is positioned between the light emitter sa and the light receiver sb, and the rear half of the rotation member 123 abuts against the fixed rack plate 20 as shown in FIG. 5A. In this case, the rotation of the rotation member 123 in one direction is restricted, with the light emitted from the light emitter sa toward the light receiver sb in the optical sensor SS3 being shielded by the light shield 124.

On the other hand, in the plate detector D3, when the sample plate sp is placed on the fixed rack plate 20, the other end 123b of the rotation member 123 is pressed farther downward than a lower surface of the sample plate sp as shown in FIG. 5B. Thus, the rotation member 123 is rotated, and the other end 123b of the rotation member 123 is lowered to a height equal to that of an upper surface of the fixed rack plate 20, and also, the light shield 124 is moved to a position upward of the optical sensor SS3. Thus, the light emitted from the light emitter sa is incident on the light receiver sb in the optical sensor SS3.

A controller 11 (FIG. 11) that controls an operation of each part of the plate changer 10 is provided in the plate changer 10 of FIG. 1. With the aforementioned configuration, the light receiver sb of the optical sensor SS3 does not receive the light from the light emitter sa in a case where the sample plate sp is not placed on the corresponding fixed rack plate 20. Thus, the light receiver sb outputs to the controller 11 (FIG. 11) a light reception signal that indicates an amount of the received light not larger than a predetermined threshold value as a detection result of detecting that the sample plate sp is not placed on the corresponding fixed rack plate 20. On the other hand, the light receiver sb of the optical sensor SS3 receives the light from the light emitter sa in a case where the sample plate sp is placed on the corresponding fixed rack plate 20. Thus, the light receiver sb outputs to the controller 11 (FIG. 11) a light reception signal that indicates an amount of the received light larger than the aforementioned threshold value as a detection result of detecting that the sample plate sp is placed on the corresponding fixed rack plate 20.

[4] Details of Auxiliary Rack Plate 30

Figure 6:
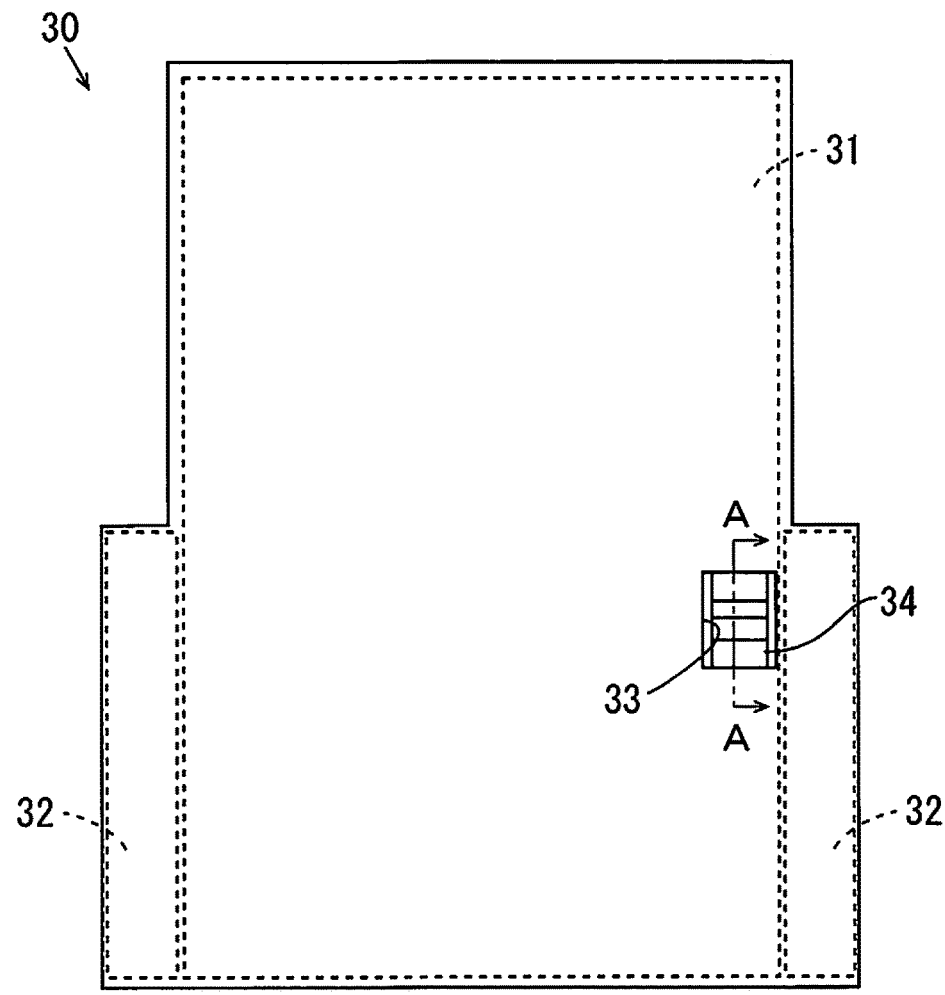
FIG. 6 is a schematic plan view of an auxiliary rack of FIGS. 2 and 3.

Details of the auxiliary rack plate 30 of FIGS. 2 and 3 will be described. FIG. 6 is a schematic plan view of the auxiliary rack plate 30 of FIGS. 2 and 3, and FIG. 7 is a cross sectional view taken along the line A-A of FIG. 6.

As shown in FIG. 6, the auxiliary rack plate 30 has a plate supporting portion 31 and a pair of supported portions 32. The plate supporting portion 31 has a rectangular shape that can support a plurality of types of sample plates sp. The pair of supported portions 32 has a shape corresponding to the pair of plate supporters 130 of FIG. 3, and is formed to project laterally by a certain width from both side portions from the one end to the center of the plate supporting portion 31. The pair of supported portions 32 is supported by the pair of plate supporters 130 (see FIG. 3) in a case where the auxiliary rack plate 30 is provided in the plate storage 100. The plate supporting portion 31 and the pair of supported portions 32 are integrally formed.

In the plate supporting portion 31, an opening 33 is formed to be adjacent to one of the supported portions 32 (the supported portion 32 corresponding to the plate supporter 130 provided on the left sidewall 101 of FIG. 3). A leaf spring 34 is provided on a lower surface of the plate supporting portion 31 in the vicinity of the opening 33.

Figure 7:
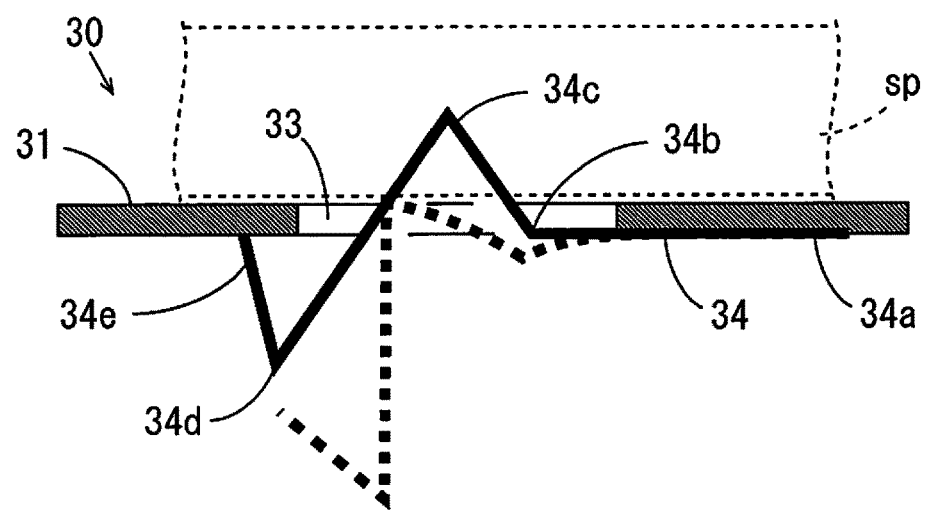
FIG. 7 is a cross sectional view taken along the line A-A of FIG. 6.

As shown in FIG. 7, the leaf spring 34 has an upper surface and a lower surface and is formed of a strip-shaped metallic member having high elasticity. The leaf spring 24 of this example has two valley-folded portions 34b, 34d folded such that the upper surfaces face each other, and one mountain-folded portion 34c folded such that the lower surfaces face each other. The valley-folded portion 34b, the mountain-folded portion 34c, and the valley-folded portion 34d line up with spacing in this order from one end 34a to another end 34e of the leaf spring 34.

The one end 34a of the leaf spring 34 is joined to the lower surface of the plate supporting portion 31 such that the valley-folded portion 34b and the mountain-folded portion 34c are positioned in the opening 33 and the other end 34e is in contact with the lower surface of the plate supporting portion 31 when the auxiliary rack plate 30 is viewed from above. In this state, the mountain-folded portion 34c of the leaf spring 34 projects farther upward than an upper surface of the plate supporting portion 31. The other end 34e of the leaf spring 34 is not joined to the lower surface of the plate supporting portion 31.

As denoted by the dotted line of FIG. 7, when a sample plate sp is placed on the plate supporting portion 31, the mountain-folded portion 34c of the leaf spring 34 is pressed downward by the sample plate sp. Thus, a portion of the leaf spring 34 that extends from the one end 34a to the mountain-folded portion 34c is bowed downward, and the valley-folded portion 34d is moved downward.

In this way, in the aforementioned auxiliary rack plate 30, a position of a lowermost end (the valley-folded portion 34d) of the leaf spring 34 in the top-and-bottom direction is changed between the state where the sample plate sp is not placed on the plate supporting portion 31 and the state where the sample plate sp is placed on the plate supporting portion 31

[5] Details of Rack Plate Detector D1 and Plate Detector D2

Figure 8:
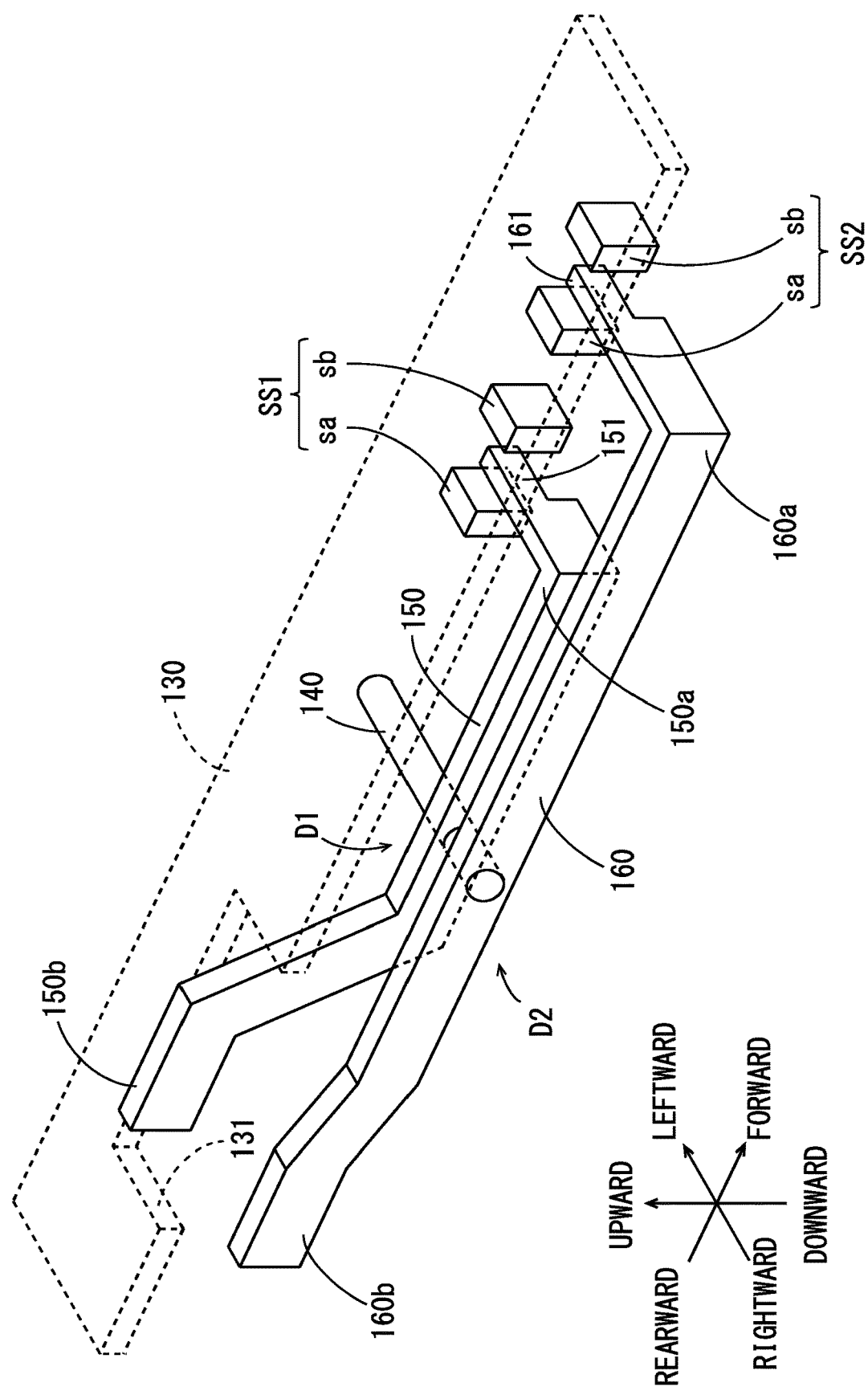
FIG. 8 is a schematic perspective view of a rack plate detector and the plate detector of FIG. 3.
Figure 10A:
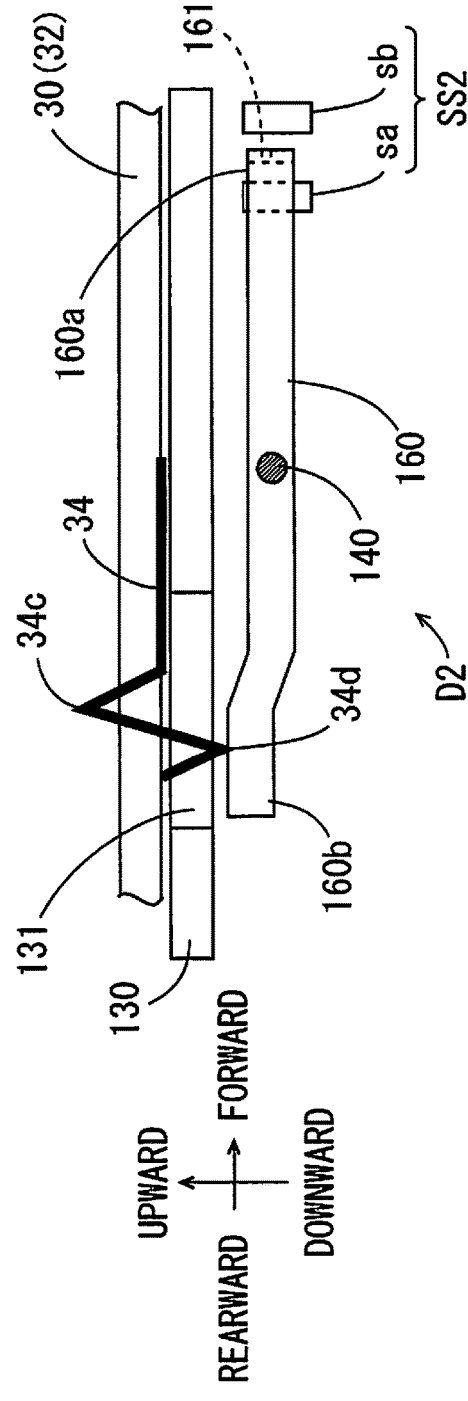
FIGS. 10A and 10B are schematic side views for explaining the function of the plate detector.
Figure 10B:
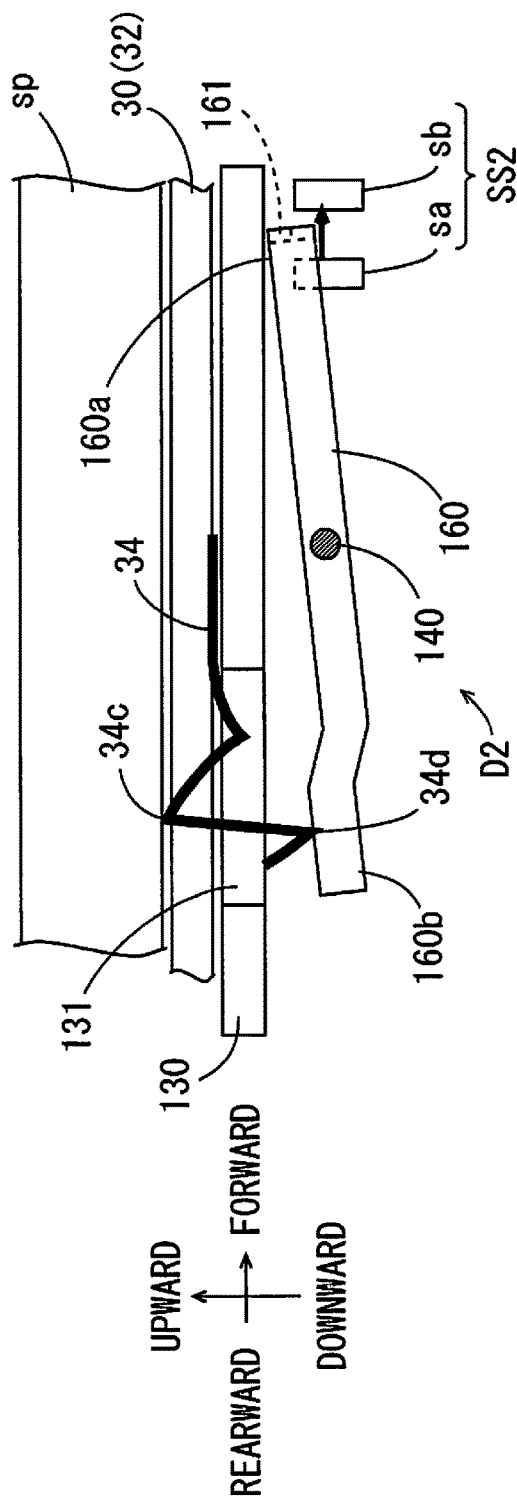

Each rack plate detector D1 and each plate detector D2 are attached to the inner surface of the left sidewall 101 so as to be positioned downward of the corresponding plate supporter 130. FIG. 8 is a schematic perspective view of the rack plate detector D1 and the plate detector D2 of FIG. 3, FIGS. 9A and 9B are schematic side views for explaining a function of the rack plate detector D1, and FIGS. 10A and 10B are schematic side views for explaining a function of the plate detector D3.

As shown in FIG. 8, the rack plate detector D1 has a basically same configuration as that of the aforementioned plate detector D3 and includes a support shaft 140, a rotation member 150, and an optical sensor SS1. The support shaft 140 extends rightward by a certain distance from the inner surface of the left sidewall 101 at a position downward of the corresponding plate supporter 130. The rotation member 150 is an elongated plate member having one end 150a and another end 150b. A center of the rotation member 150 is attached to the support shaft 140 such that the rotation member 150 extends basically in the front-and-rear direction and is rotatable around the support shaft 140. In this state, the one end 150a is positioned forward of the other end 150b.

A front half of the rotation member 150 extends linearly. The one end 150a of the rotation member 150 is bent leftward to the inner surface of the left sidewall 101. A tip of the one end 150a is provided with a light shield 151. A rear half of the rotation member 150 is bent obliquely upward with the rotation member 150 attached to the support shaft 140.

Also, the rotation member 150 is formed such that a weight of the front half is larger than that of the rear half. As such, a torque directed in one direction is generated in the rotation member 150 such that the front half is lowered and the rear half is raised without a load applied to the rotation member 150.

A notch 131 is formed in the plate supporter 130. With the front half of the rotation member 150 of a corresponding rack plate detector D1 being held horizontally, the notch 131 guides the other end 150b of the rotation member 150 from a space downward of the plate supporter 130 to a space upward of the plate supporter 130.

Similarly to the optical sensor SS3, the optical sensor SS1 is a transmissive photointerrupter having a light emitter sa and a light receiver sb, and is attached to the inner surface of the left sidewall 101 at a position downward of the corresponding plate supporter 130 and forward of the support shaft 140. The light receiver sb of the optical sensor SS1 is configured to be capable of receiving light emitted from the light emitter sa and is also configured to output a signal corresponding to an amount of the received light. The light emitter sa and the light receiver sb of the optical sensor SS1 are arranged in the front-and-rear direction with a spacing therebetween to interpose a moving path of the light shield 151 therebetween when the rotation member 150 rotates about the support shaft 140. As the optical sensor SS1, a reflective photointerrupter may be used.

In the aforementioned rack plate detector D1, with the auxiliary rack plate 30 not placed on the plate supporter 130, the light shield 151 is positioned between the light emitter sa and the light receiver sb, and the rear half of the rotation member 150 abuts against the plate supporter 130 as shown in FIG. 9A. In this case, the rotation of the rotation member 150 in one direction is restricted with the light emitted from the light emitter sa toward the light receiver sb in the optical sensor SS1 being shielded by the light shield 151.

On the other hand, in the rack plate detector D1, when the auxiliary rack plate 30 is placed on the plate supporter 130, the other end 150b of the rotation member 150 is pressed farther downward than a lower surface of the auxiliary rack plate 30 as shown in FIG. 9B. Thus, the rotation member 150 is rotated, and the other end 150b of the rotation member 150 is lowered to a height equal to that of an upper surface of the plate supporter 130, and also, the light shield 151 is moved to a position upward of the optical sensor SS1. Thus, the light emitted from the light emitter sa is incident on the light receiver sb in the optical sensor SS1.

With the aforementioned configuration, the light receiver sb of the optical sensor SS1 does not receive the light from the light emitter sa in a case where the auxiliary rack plate 30 is not placed on the corresponding plate supporter 130. Thus, the light receiver sb outputs to the controller 11 (FIG. 11) a light reception signal that indicates an amount of the received light not larger than a predetermined threshold value as a detection result of detecting that the auxiliary rack plate 30 is not placed on the corresponding plate supporter 130. On the other hand, the light receiver sb of the optical sensor SS receives the light from the light emitter sa in a case where the auxiliary rack plate 30 is placed on the corresponding plate supporter 130. Thus, the light receiver sb outputs to the controller 11 (FIG. 11) a light reception signal that indicates an amount of the received light larger than the aforementioned threshold value as a detection result of detecting that the auxiliary rack plate 30 is placed on the corresponding plate supporter 130.

As shown in FIG. 8, the plate detector D2 is provided to be adjacent to the rack plate detector D1 and includes a support shaft 140, a rotation member 160, and an optical sensor SS2. The plate detector D2 of this example is positioned farther inward (rightward in this example) of the plate storage 100 than the rack plate detector D1.

The support shaft 140 is used in common between the adjacent rack plate detector D1 and the plate detector D2. The rotation member 160 is an elongated plate member having one end 160a and another end 160b. A center of the rotation member 160 is attached to the support shaft 140 such that the rotation member 160 extends basically in the front-and-rear direction and is rotatable around the support shaft 140. In this state, the one end 160a is positioned forward of the other end 160b.

The rotation member 160 extends substantially linearly from the one end 160a to the other end 160b. The one end 160a of the rotation member 160 is bent leftward to the inner surface of the left sidewall 101. A tip of the one end 160a is provided with a light shield 161.

With the rotation member 160 attached to the support shaft 140, at least the other end 160b of the rotation member 160 is positioned farther inward (rightward) of the plate storage 100 than the plate supporter 130.

Also, the rotation member 160 is formed such that a weight of a front half of the rotation member 160 is larger than that of a rear half of the rotation member 160. As such, a torque directed in one direction is generated in the rotation member 160 such that the front half is lowered and the rear half is raised without a load applied to the rotation member 160. The plate detector D2 is provided with a rotation restriction mechanism not shown that restricts rotation of the rotation member 160 in the one direction from a state where the rotation member 160 extends in a horizontal direction and allows rotation of the rotation member 160 in a direction opposite to the one direction from the state where the rotation member 160 extends in the horizontal direction.

Similarly to the optical sensor SS3, the optical sensor SS2 is a transmissive photointerrupter having a light emitter sa and a light receiver sb, and is attached to the inner surface of the left sidewall 101 at a position downward of the corresponding plate supporter 130 and forward of the support shaft 140 and the optical sensor SS1. The light receiver sb of the optical sensor SS2 is configured to be capable of receiving light emitted from the light emitter sa and is also configured to output a signal corresponding to an amount of the received light. The light emitter sa and the light receiver sb of the optical sensor SS2 are arranged in the front-and-rear direction with a spacing therebetween to interpose a moving path of the light shield 161 therebetween when the rotation member 160 rotates about the support shaft 140. As the optical sensor SS2, a reflective photointerrupter may be used.

When the auxiliary rack plate 30 is placed on the pair of plate supporters 130, the auxiliary rack plate 30 is positioned such that the opening 33 (FIG. 6) overlaps with the other end 160b of the rotation member 160 in the top-and-bottom direction. In this case, the valley-folded portion 34d of the leaf spring 34 (FIG. 6) is positioned farther downward than the plate supporters 130 and is in proximity to the other end 160b of the rotation member 160. The leaf spring 34 is formed so as not to press the other end 160b of the rotation member 160 downward with the auxiliary rack plate 30 placed on the plate supporters 130 and the sample plate sp not placed on the auxiliary rack plate 30. Thus, in the aforementioned plate detector D2, with the auxiliary rack plate 30 not placed on the plate supporters 130, and with the auxiliary rack plate 30 placed on the plate supporters 130 and the sample plate sp not placed on the auxiliary rack plate 30 as shown in FIG. 10A, the rotation member 160 is held horizontally. At this time, the light emitted from the light emitter sa to the light receiver sb in the optical sensor SS2 is shielded by the light shield 161.

On the other hand, in the plate detector D2, when the auxiliary rack plate 30 is placed on the plate supporters 130 and the sample plate sp is placed on the auxiliary rack plate 30, the leaf spring 34 of the auxiliary rack plate 30 is elastically deformed by the sample plate sp, as shown in FIG. 10B. In this case, the lowermost end of the leaf spring 34 (the valley-folded portion 34d) is lowered, and the other end 160b of the rotation member 160 positioned farther downward than the plate supporters 130 is pressed downward by the leaf spring 34. Thus, the rotation member 160 is rotated, and the light shield 161 is moved to a position upward of the optical sensor SS2. Accordingly, the light emitted from the light emitter sa is incident on the light receiver sb in the optical sensor SS2.

With the aforementioned configuration, the light receiver sb of the optical sensor SS2 does not receive the light from the light emitter sa in the case where the sample plate sp is not placed on the auxiliary rack plate 30 supported by the corresponding plate supporters 130. Thus, the light receiver sb outputs to the controller 11 (FIG. 11) the light reception signal indicating the amount of the received light not larger than the predetermined threshold value as the detection result of detecting that the sample plate sp is not placed on the auxiliary rack plate 30 supported by the corresponding plate supporters 130. On the other hand, the light receiver sb of the optical sensor SS2 receives the light from the light emitter sa in the case where the sample plate sp is placed on the auxiliary rack plate 30 supported by the corresponding plate supporters 130. Thus, the light receiver sb outputs to the controller 11 (FIG. 11) the light reception signal indicating the amount of the received light larger than the aforementioned threshold value as the detection result of detecting that the sample plate sp is placed on the auxiliary rack plate 30 supported by the corresponding plate supporters 130.

[6] Control System of Plate Changer 10

FIG. 11 is a block diagram for explaining a control system of the plate changer 10. As shown in FIG. 11, the plate changer 10 includes the controller 11, the plurality of rack plate detectors D1, the plurality of plate detectors D2, the plurality of plate detectors D3, the transport robot 190R, and a plurality of auxiliary rack plate indicators ID.

As described above, each rack plate detector D1 outputs the signal (light reception signal) indicating whether the auxiliary rack plate 30 is placed on the corresponding plate supporter 130 to the controller 11. Also, each plate detector D2 outputs the signal (light reception signal) indicating whether the sample plate sp as well as the auxiliary rack plate 30 are placed on the corresponding plate supporter 130 to the controller 11. Furthermore, each plate detector D3 outputs the light reception signal indicating whether the sample plate sp is placed on the corresponding fixed rack plate 20 to the controller 11.

The plurality of auxiliary rack plate indicators ID correspond to the plurality of plate supporters 130 provided on the left sidewall 101, respectively. Each auxiliary rack plate indicator ID includes a light emitting device such as a light emitting diode and a driving circuit thereof and is provided, for example, on a front surface of the door 109 of FIG. 1.

The controller 11 includes, for example, a CPU and a memory and controls an operation of the transport robot 190R based on the signals output from the plurality of rack plate detectors D1 and the plurality of plate detectors D2, D3. Also, the controller 11 transmits various information about the supply and collection of the sample plates sp in the autosampler 4 to the control unit 2 or receives such information from the control unit 2.

Moreover, the controller 11 controls a light emission state of each of the plurality of auxiliary rack plate indicators ID based on the signals output from the plurality of rack plate detectors D1. For example, with the auxiliary rack plate 30 placed on one plate supporter 130, the controller 11 lights up the auxiliary rack plate indicator ID corresponding to the one plate supporter 130. Also, with the auxiliary rack plate 30 not placed on one plate supporter 130, the controller 11 lights off the auxiliary rack plate indicator ID corresponding to the one plate supporter 130. Thus, the user can easily identify the attached states of the plurality of auxiliary rack plates 30 in the plate changer 10 by viewing the light emission state of the auxiliary rack plate indicator ID corresponding to each plate supporter 130.

[7] Effects (a) In the aforementioned plate changer 10, the rack plate detector D1 detects whether the auxiliary rack plate 30 is supported on each plate supporter 130 arranged in the top-and-bottom direction. This makes it possible to accurately identify the position of the auxiliary rack plate 30 provided in the plate storage 100. Thus, reliability of transportation of the sample plates sp in the plate changer 10 is improved.

(b) In the aforementioned plate changer 10, the user can easily make the auxiliary rack plate 30 supported on any of the plurality of plate supporters 130 in the plate storage 100. Also, the user can easily remove the auxiliary rack plate 30 supported on any of the plurality of plate supporters 130. In this way, since the number of the auxiliary rack plates 30 in the plate storage 100 is variable, the user can effectively utilize an internal space of the plate storage 100 depending on a dimension of the sample plate sp to be used in the top-and-bottom direction and a dimension of the plate storage 100 in the top-and-bottom direction.

(c) Furthermore, in the aforementioned plate changer 10, the plate detector D2 detects whether the sample plate sp is placed on each auxiliary rack plate 30. The plate detector D3 detects whether the sample plate sp is placed on each fixed rack plate 20. This makes it possible to accurately identify a storage state of the plurality of sample plates sp in the plate storage 100.

(d) The liquid chromatograph 1 of FIG. 1 includes the aforementioned plate changer 10. Thus, reliability of a supply operation and a collection operation of the sample plates sp to the autosampler 4 is improved while efficiency of an analysis operation is improved.

[8] Other Embodiments (a) While the optical sensors SS1, SS2, SS3 are used to detect whether the auxiliary rack plate 30 is placed on the plate supporter 130, whether the sample plate sp is placed on the plate supporter 130, and whether the sample plate sp is placed on the fixed rack plate 20 in the above-described embodiment, the present invention is not limited to this. As configurations for detecting each of the above-described placement states, other electric apparatuses such as proximity sensors or switches may be used in place of the optical sensors SS1, SS2, SS3.

(b) While the plurality of rack plate detectors D1, the plurality of plate detectors D2, and the plurality of plate detectors D3 are together provided on the inner surface of the left sidewall 101 in the above-described embodiment, the present invention is not limited to this. Some or all of the plurality of rack plate detectors D1, the plurality of plate detectors D2, and the plurality of plate detectors D3 may be provided on the inner surface of the right sidewall 102.

(c) While the rack plate detector D1 and the plate detector D2 that correspond to one plate supporter 130 are provided on the left sidewall 101 to be adjacent to each other, and the support shaft 140 is used as a constituent element common to the rack plate detector D1 and the plate detector D2 in the above-described embodiment, the present invention is not limited to this. The rack plate detector D1 and the plate detector D2 corresponding to the one plate supporter 130 may be provided independently at positions spaced apart from each other. In this case, the rack plate detector D1 and the plate detector D2 corresponding to the one plate supporter 130 each have an individual support shaft.

(d) While the plurality of fixed rack plates 20 are provided in the plate storage 100 in the plate changer 10 according to the above-described embodiment, the plurality of fixed rack plates 20 do not have to be provided. For example, a plurality of pairs of plate supporters 130 may be provided in place of the plurality of fixed rack plates 20 of FIG. 3. In this case, flexibility in attachment of the auxiliary rack plate 30 in the plate storage 100 is improved.

(e) While the attachment states of the plurality of auxiliary rack plates 30 in the plate storage 100 are displayed by the plurality of auxiliary rack plate indicators ID in the plate changer 10 according to the above-described embodiment, the present invention is not limited to this. The plate changer 10 may have, for example, a presentation device (such as a display device or a sound output device) that presents the placement states of the sample plates sp on the plurality of auxiliary rack plates 30 and on the plurality of fixed rack plates 20 to the user.

In this case, for example, when the detection results by the plurality of plate detectors D2, D3 are presented to the user, the user can easily identify the storage states of the sample plates sp in the plate storage 100.

(f) While the plurality of pairs of plate supporters 130 are provided in the plate storage 100 in the plate changer 10 according to the above-described embodiment, the present invention is not limited to this. Only one pair of plate supporters 130 may be provided in the plate storage 100.

(g) While the plate changer 10 is used in the liquid chromatograph in the above-described embodiment, the plate changer 10 can be used also in other chromatographs such as a supercritical fluid chromatograph and a gas chromatograph.

[9] Correspondences Between Constituent Elements in Claims and Parts in Embodiments In the following paragraphs, examples of correspondences between constituent elements in claims below and parts in the embodiments are explained.

In the above-described embodiment, the plate storage 100 is an example of a casing, the auxiliary rack plate 30 is an example of a first rack plate, the pair of plate supporters 130 is an example of plate supporters, the plurality of rack plate detectors D1 are an example of a first detector, the rotation member 150 is an example of a first movable member, the optical sensor SS1 is an example of a first sensor, the state of the rotation member 150 when another end 150b is positioned farther upward than the plate supporter 130 is an example of a first state, the state of the rotation member 150 when another end 150b is positioned at a height equal to that of an upper surface of the plate supporter 130 is an example of a second state, the region between the light emitter sa and the light receiver sb of the optical sensor SS1 is an example of a first detection region, the light shield 151 is an example of a first light shield, and the support shaft 140 is an example of first and second rotation shafts.

Also, the plurality of plate detectors D2 are an example of a second detector, the plate detector D2 is an example of a first plate detector, the rotation member 160 is an example of a second movable member, the optical sensor SS2 is an example of a second sensor, the state where the rotation member 160 is held horizontally is an example of a third state, the state of the rotation member 160 when another end 160b is positioned farther downward than the support shaft 140 is an example of a fourth state, the region between the light emitter sa and the light receiver sb of the optical sensor SS2 is an example of a second detection region, the light shield 161 is an example of a second light shield, and the leaf spring 34 is an example of an elastic member.

Also, the fixed rack plate 20 is an example of a second rack plate, the plurality of plate detectors D3 are an example of a third detector, the plate detector D3 is an example of a second plate detector, the rotation member 123 is an example of a third movable member, the optical sensor SS3 is an example of a third sensor, the state of the rotation member 123 when another end 123b is positioned farther upward than the fixed rack plate 20 is a fifth state, the state of the rotation member 123 when another end 123b is positioned at a height equal to that of the upper surface of the fixed rack plate 20 is a sixth state, the region between the light emitter sa and the light receiver sb of the optical sensor SS3 is an example of a third detection region, and the light shield 124 is an example of a third shield.

In addition, the auxiliary rack plate indicator ID is an example of a presenter, and the liquid chromatograph 1 is an example of a chromatograph.

As each of various elements recited in the claims, various other elements having configurations or functions described in the claims can be also used.

The invention claimed is:

1. A plate changer that carries out supply and collection of a sample plate to an autosampler, comprising:
   a casing that stores a sample plate;
   a plurality of first rack plates that each support the sample plate;
   a plurality of plate supporters that respectively support the one or plurality of first rack plates at different heights in the casing; and
   a first detector that detects whether the first rack plate is supported on each plate supporter,
   wherein each first rack plate is configured to be supportable on and removable from any of the plurality of plate supporters.

2. A plate changer that carries out supply and collection of a sample plate to an autosampler, comprising:
   a casing that stores a sample plate;
   one or a plurality of first rack plates that each support the sample plate;
   one or a plurality of plate supporters that respectively support the one or plurality of first rack plates at different heights in the casing; and
   a first detector that detects whether the first rack plate is supported on each plate supporter,
   wherein each first rack plate is configured to be supportable on and removable from the one or plurality of plate supporters,
   the first detector includes one or a plurality of rack plate detectors that are respectively provided corresponding to the one or plurality of plate supporters,
   each rack plate detector including
a first movable member configured to be changeable between a first state and a second state, and
   a first sensor that detects which one of the first state and the second state the first movable member is in, and
   the first movable member is provided to be brought into the first state when the first rack plate is not supported on the corresponding plate supporter and brought into the second state when the first rack plate is supported on the corresponding plate supporter.

3. The plate changer according to claim 2, wherein the first sensor is an optical sensor that emits light to a predetermined first detection region and also receives light from the first detection region to output a signal corresponding to an amount of the received light, and
   the first movable member has a first light shield configured to shield the light emitted from the first sensor, and is provided such that the first light shield is positioned in the first detection region when the first movable member is in one of the first state and the second state and such that the first light shield is positioned outside of the first detection region when the first movable member is in the other of the first state and the second state.

4. The plate changer according to claim 3, wherein the first movable member is changeable to the first state and the second state by being rotated around a predetermined first rotation shaft, the first movable member is held in the first state by not abutting against the first rack plate when the first rack plate is not supported on the corresponding plate supporter, and the first movable member is held in the second state by abutting against the first rack plate when the first rack plate is supported on the corresponding plate supporter.

5. The plate changer according to claim 1, further comprising a presenter that presents a detection result by the first detector.

6. A chromatograph comprising:
   an autosampler; and
   the plate changer according to claim 1.

7. A plate changer that carries out supply and collection of a sample plate to an autosampler, comprising:
   a casing that stores a sample plate;
   one or a plurality of first rack plates that each support the sample plate;
   one or a plurality of plate supporters that respectively support the one or plurality of first rack plates at different heights in the casing;
   a first detector that detects whether the first rack plate is supported on each plate supporter; and
   a second detector that detects whether the sample plate is placed on each of the one or plurality of first rack plates supported on the one or plurality of plate supporters,
   wherein each first rack plate is configured to be supportable on and removable from the one or plurality of plate supporters,
   the second detector includes one or a plurality of first plate detectors respectively provided corresponding to the one or plurality of plate supporters,
   each first plate detector including
   a second movable member configured to be changeable between a third state and a fourth state, and
   a second sensor that detects in which one of the third state and the fourth state the second movable member is in,
   wherein the second movable member is provided to be brought into the third state when the first rack plate is not supported on the corresponding plate supporter and when the first rack plate is supported on the corresponding plate supporter and the sample plate is not supported on the first rack plate, and brought into the fourth state when the first rack plate is supported on the corresponding plate supporter and the sample plate is supported on the first rack plate.

8. The plate changer according to claim 7, wherein the second sensor is an optical sensor that emits light to a predetermined second detection region and also receives light from the second detection region to output a signal corresponding to an amount of the received light, and
   the second movable member has a second light shield configured to shield the light emitted from the second sensor, and is provided such that the second light shield is positioned in the second detection region when the second movable member is in one of the third state and the fourth state and such that the second light shield is positioned outside of the second detection region when the second movable member is in the other of the third state and the fourth state.

9. The plate changer according to claim 8, wherein each first rack plate is provided with an elastic member that is deformed by the sample plate supported on the first rack plate, and the second movable member is changeable to the third state and the fourth state by being rotated around a predetermined second rotation shaft, the second movable member is held in the third state by not abutting against the elastic member when the first rack plate is not supported on the corresponding plate supporter and when the first rack plate is supported on the corresponding plate supporter and the sample plate is not supported on the first rack plate, and the second movable member is held in the fourth state by abutting against the deformed elastic member provided on the first rack plate when the first rack plate is supported on the corresponding plate supporter and the sample plate is supported on the first rack plate.

10. A plate chancier that carries out supply and collection of a sample plate to an autosampler, comprising:
a casing that stores a sample plate;
one or a plurality of first rack plates that each support the sample plate;
one or a plurality of plate supporters that respectively support the one or plurality of first rack plates at different heights in the casing; and
a first detector that detects whether the first rack plate is supported on each plate supporter,
wherein each first rack plate is configured to be supportable on and removable from the one or plurality of plate supporters,
the plate changer further comprising one or a plurality of second rack plates that are fixed at heights different from the heights of the one or plurality of plate supporters in the casing and each support the sample plate.

11. The plate changer according to claim 10, further comprising a third detector that detects whether the sample plate is placed on each of the one or plurality of second rack plates.

12. The plate changer according to claim 11, wherein the third detector includes one or a plurality of second plate detectors that are respectively provided corresponding to the one or plurality of second rack plates,
each second plate detector including a third movable member configured to be changeable between a fifth state and a sixth state, and
a third sensor that detects which one of the fifth state and the sixth state the third movable member is in, and
the third movable member is provided to be brought into the fifth state when the sample plate is not supported on the corresponding second rack plate and brought into the sixth state when the sample plate is supported on the corresponding second rack plate.

13. The plate changer according to claim 12, wherein the third sensor is an optical sensor that emits light to a predetermined third detection region and also receives light from the third detection region to output a signal corresponding to an amount of the received light, and
the third movable member has a third light shield capable of shielding the light emitted from the third sensor, and is provided such that the third light shield is positioned in the third detection region when the third movable member is in one of the fifth state and the sixth state and such that the third light shield is positioned outside of the third detection region when the third movable member is in the other of the fifth state and the sixth state.

14. The plate changer according to claim 13, wherein the third movable member is changeable to the fifth state and the sixth state by being rotated around a predetermined third rotation shaft, the third movable member is held in the fifth state by not abutting against the sample plate when the sample plate is not supported on the corresponding second rack plate, and the third movable member is held in the sixth state by abutting against the sample plate when the sample plate is supported on the corresponding second rack plate.

* * * * *